United States Patent [19]

Baranoff-Rossine

[11] Patent Number: 4,495,526
[45] Date of Patent: Jan. 22, 1985

[54] METHOD AND APPARATUS FOR IDENTIFYING SOUND RECORDINGS

[75] Inventor: Dimitri Baranoff-Rossine, Paris, France

[73] Assignee: Societe Scome-France, La Roche Guyon, France

[21] Appl. No.: 436,348

[22] Filed: Oct. 25, 1982

[30] Foreign Application Priority Data

Oct. 28, 1981 [FR] France .............................. 81 20250

[51] Int. Cl.³ .......................... G11B 5/86; G11B 15/04
[52] U.S. Cl. .......................................... 360/15; 360/60
[58] Field of Search ........................ 360/15, 60, 27, 28

[56] References Cited

U.S. PATENT DOCUMENTS

4,086,634 4/1978 Cook ...................................... 360/60

Primary Examiner—Vincent P. Canney
Attorney, Agent, or Firm—Bucknam and Archer

[57] ABSTRACT

In an installation comprising a master assembly for reading the sound information signals and the end-of-program sequence signals recorded on a master tape, and at least one slave assembly to record a second time the read out signals, the slave assembly comprises circuits for detecting and regenerating end-of-sequence signals, which circuits are connected to the output of the said recording amplifier, digital coding circuits by derivation from a pilot frequency for producing a coded auxiliary digital signal, means to modify the digital coding at each new detection of end-of-sequence signals and an adder circuit to add the coded auxiliary digital signal with the sound information signal before re-recording the latter.

18 Claims, 5 Drawing Figures

METHOD AND APPARATUS FOR IDENTIFYING SOUND RECORDINGS

The present invention relates to a method for identifying a sound recording recorded on at least one track of a recording medium such as a magnetic tape, said method consisting in associating a coded auxiliary signal with the sound information signal.

The invention also relates to the use of said method in an installation for duplicating sound recordings, recorded on at least one track of a recording medium such as a magnetic tape, the duplicating installation comprising: a master assembly for reading out the sound information signal and the end-of-program sequence signals recorded on a master tape, and at least one slave recording assembly for finally recording on an individual medium said sound information signals and end-of-sequence signals read from the master tape, the slave recording assembly comprising, at least one slave equalizer circuit, one polarization oscillator and a premagnetizing power amplifier which are associated with a recording equalizer circuit and with a recording amplifier circuit.

Unauthorized copies of existing sound recordings are often made. on media such as discs, magnetic tapes and especially cassette-mounted tapes. This phenomenon, known as "piracy of sound recordings" is very prejudicial to authors-composers who cannot claim "mechanical" reproduction royalties on the pirate copies which constitute unauthorized replications of lawfully made sound recordings.

To solve the problem of piracy, it is necessary to be able to identify the pirate copies with certainty, without the control means used to this effect affecting the quality of the principal sound information signals recorded on the investigating record medium.

It has already been proposed to superimpose on the recorded principal information signal a coded auxiliary signal permitting to identify the origin of the recording. However, according to some of the known systems, the superimposition of an additional control signal affects the quality of the reproduction of the principal signal. According to other known systems, the coded signal superimposed on the principal signal is not adapted to be different for each unit of a batch of recording media such as cassettes, which are simultaneously recorded from one and the same recording provided on a master tape. Thus, several recordings all present a common coding signal and thereagain there is no way to determine whether or not a tested recording is an authorized copy.

It is therefore an the object of the present invention to overcome the aforesaid disadvantages and to give the possibility of establishing definitely and accurately whether or not the recording under test is a pirate recording, with the additional possibility of establishing the exact origin of the recording. It is another object of the invention to recorded, on each individual medium of final recording, such as a cassette, an original code of identification which is specific to that individual recording medium, and which will not affect the quality of the recorded program.

These objects are reached with a method for identifying a sound recording made on at least one track of a recording medium such as for example a magnetic tape of cassette said method, consisting in introducing an auxiliary signal during an individual recording operation of the sound information signal on the final recording medium, from the readout of a master tape on which, both the sound information signal and an end-ofsequence signal inserted between two sequences of program of the sound information signal have been recorded beforehand, the auxiliary signal being constituted by a which is digital signal derived from a pilot frequency and incremented at each detection of an end-of-sequence signal when the master tape is read out, and in mixing the auxiliary signal with the sound information signal while recording the sound information signal on the final recording medium in such a way as to inscribe the auxiliary signal repeatedly throughout the whole recording, the coded digital auxiliary signal being derived from a pilot frequency F which corresponds to a basic frequency f situated in a range outside the spectrum of audible frequencies towards the ultra-sounds multiplied by a factor equal to the ratio of the advancing speed of the individual medium of final recording during the individual recording operation, to the advance speed of the individual medium of final recording during normal readout thereof.

Preferably, the auxiliary signal is mixed with the sound information signal once the latter has gone through the equalizer circuits provided in the individual device used for recording on the final recording medium.

According to a possible application of the present invention, several individual operations of simultaneous recording of the same sound information signal are associated with coded auxiliary signals specific to every final recording medium, and said individual recording operations are conducted in cooperation with only one readout of a common master tape.

According to another special feature of the invention, in the course of two simultaneous individual recording operations to record on two different tracks of the same final recording medium from the readout of the two corresponding tracks of a master tape, a first coded auxiliary signal is introduced on one track of the final recording medium, while a second coded auxiliary signal corresponding to a signal coded sequentially coded in reverse to the first signal, is introduced on the other track of the final recording medium.

By way of example, in the method according to the invention, which can be used in combination with a fast speed duplicating of sound recordings, the said multiplying factor can be equal to 8, 16, 32 or 64.

The basic frequency f is advantageously between about 15 and 18 kHz.

According to a particular feature of the invention, the end-of-program sequence signal has a basic frequency which can vary between about 5 Hz and 10 Hz, said signal is carried by an amplitude modulation and is recorded on the master tape in the free gaps situated between two different consecutive program sequences of the sound information signal.

Preferably, the said auxiliary signal is recorded at a level of amplitude lower by several tens of decibels than the maximum level of the sound information signal.

According to a particular embodiment of the invention, the auxiliary signal comprises, after a fixed frequency period, a primary synchronization period defining a digital signal rate, a secondary synchronization period comprising a coded group known as format group, then a specific coded group of which at least one part is modified after every detection of an end-of-sequence signal.

The specific coded group can itself contain information relative to the place, date and time of recording, to the number of the recording machine and to the order number of the individual recording made during a recording of a series of individual media of final recordings, on the same machine and over a predetermined time period.

The invention also relates to a duplicating installation of the type mentioned hereinabove, wherein the slave assembly comprises circuits for detecting and regenerating end-of-sequence signals, which circuits are connected to the output of the said recording amplifier, digital coding circuits by derivation from a pilot frequency for producing a coded auxiliary digital signal, means associated to the endof-sequence signal regenerating circuit and connected to the digital coding circuits to modify the digital coding at each new detection of end-of-sequence signals and an adder circuit to add the coded auxiliary digital signal with the sound information signal and upstream of the slave recording head on the final recording individual medium.

The end-of-sequence signal regeneration and detection circuits comprise a passband filter and a detection circuit for regenerating a demodulated binary coded end-of-sequence signal.

The circuits for digitally coding by derivation from a frequency comprise a stabilized reference clock, a phase comparator with a first input connected to the output of a fixed divider circuit, a voltage controlled oscillator, which is connected, on the one hand, to a programmed divider circuit and, on the other hand, to a shaping circuit giving a pure sinusoidal shape, the output of the shaping circuit being connected to the adder circuit, an integrating circuit being also inserted between the output of the said phase comparator and the voltagecontrolled oscillator and the programmed divider being connected on the one hand to a microprocessor which receives the clock signals of the information material for producing the coded auxiliary digital signal, and the end-of-sequence demodulated binary signal, and on the other hand, to a second input of the said phase comparator.

The information material for producing the coded auxiliary digital signal is recorded in memories associated with the microprocessor.

Authorization means are provided to deliver the information for producing the coded auxiliary digital signal only in response to the application of a safety code to the microprocessor.

Said authorization means can authorize the delivery of only a predetermined number of items of information for producing the coded auxiliary digital signal when a safety code is applied.

Advantageously, the safety code is applied by way of a medium such as a magnetic card or static cassette and information is recorded on the said medium when the authorization means have given an authorization in response to the application of the safety code.

It will be noted that the method and installation according to the invention enable the allocating a different code to each individual recording made, even in the case of a great series of recordings made in one operation. The code inserted in each recording does not affect the quality of the recorded sound signal and further enables the identification of the origin of the production. To control whether or not, in a series of cassettes for example, the recordings are pirate recordings, it is sufficient that the codes of two different cassettes be detected or compared with one another. If the cassettes really are original copies, they will necessarily present two different codes. If on the contrary, the cassettes are pirate copies, the detection will reveal either an absence of code or two identical codes corresponding to the code of the original cassette from which the pirate copies have been made.

In addition, the modifications which are required to be made to existing duplicating installations in order to carry out the method according to the invention are simple and inexpensive as seen from the aforesaid features.

The invention will be more readily understood on reading the following description with reference to the accompanying drawings in which:

FIG. 3 is an example of end-ofsequence coded signal.

Figure 1:
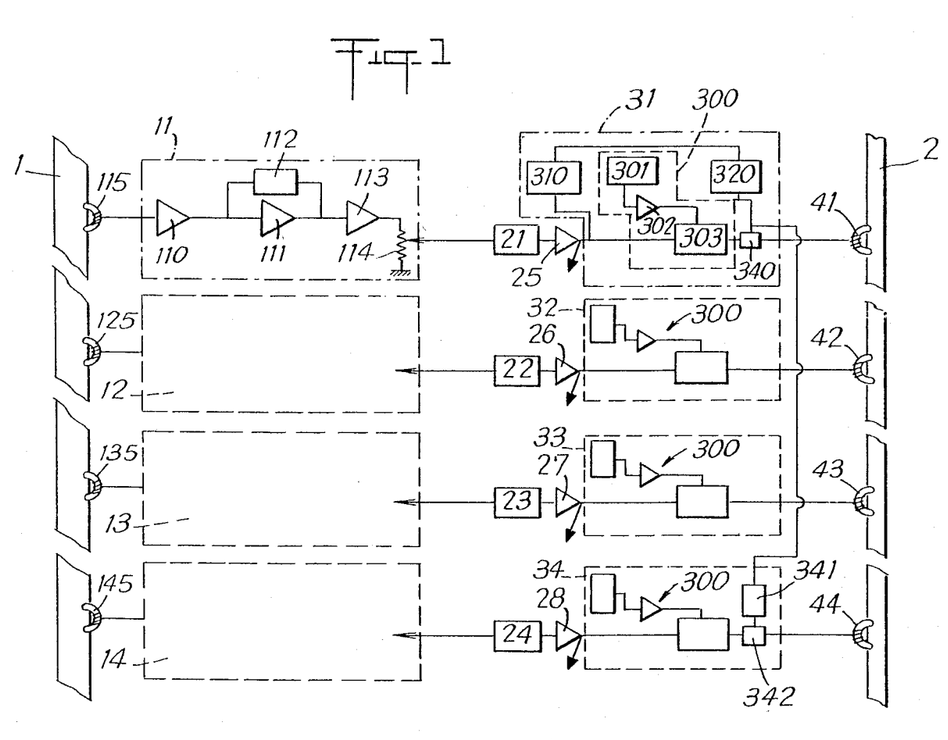
FIG. 1 is a diagrammatical view of a sound recording duplicating installation using the invention.

FIG. 1 shows a diagram of part of an installation for instant duplicating of sound recordings. It is known that this type of installation uses a master tape 1, which is pre-recorded at a recording speed generally equal to the readout speed of the final recording media on which the sound program pre-recorded on the master tape will be duplicated. Said pre-recording speed could, however, in certain cases, be slightly different from the readout speed of the final recording media, for example it could be equal to twice or half that readout speed.

The duplicating installation comprises, for each track of the master tape 1, a transducer head or reading head such as 115 associated with a playback unit or reading unit such as 11, which is also known as a master assembly and is designed to supply electrical signals which represent the sound program recorded on the corresponding track of the master tape 1. In a fast speed duplicating installation, the master tape is read at a much greater speed than the recording speed of said master tape, the multiplying factor being for example equal to 32. This allows for gaining time when duplicating, but then of course the processed electrical signals have frequencies higher than the range of audible frequencies.

A reading unit 11 of a master assembly comprises in known manner a reading preamplifier 110 connected to the corresponding reading head 115, a reading amplifier 111 connected to the output of the reading preamplifier 110, a readout power amplifier 113 connected to the output of the readout amplifier 111, an attenuator 114 connected to the output of the readout power amplifier 113 and a readout equalizer circuit 112 mounted in parallel on the readout amplifier 111.

The master tape 1 comprises the recording of at least one sequence of sound program on which it is possible to superimpose an associated coded signal carrying information material relating for example to the title of the recorded work and to the author of said work. Said associated coded signal can for example be such as that defined in U.S. Pat. No. 4,333,113. An end-of-sequence signal is also recorded on the master tape 1 between two successive sequences of sound program so as to enable the locating of the end of every sequence of sound program and the beginning of the next one.

The end-of-sequence signal can be coded and inserted between the different pieces of a program designed to be recorded on the same magnetic tape unit to be subsequently loaded for example in an individual cassette. Said end-of-sequence signal will permit, when reading out the cassette, to automatically locate each program piece and automatically position the reading head at the beginning of the selected piece. A special code is also allocated to the end-of-sequence signal situated at the end of the last recorded piece and designed to locate the end of the recorded program. In the following portion of the specification, the end of sequence signal will exclusively designate the end-of-sequence signal which is intended to identify the end of a program to be recorded on the same cassette, or more generally, on one and the same final recording medium 2. Indeed, in the case of a fast speed duplicating installation, it is this endof-sequence signal which is useful before anything else. When a sound program corresponding to the contents of a cassette to be recorded, is pre-recorded on a continuous loop master tape 1, the end-of-sequence signal allows for locating the beginning of every repeated readout of the pre-recorded program read from the master tape for subsequent duplication on a final tape 2.

Figure 3:
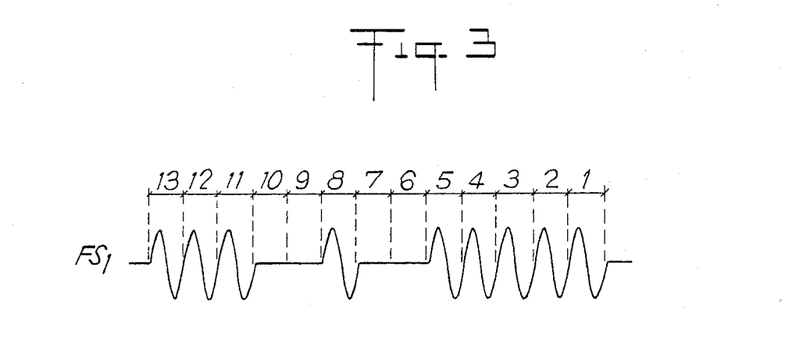

The end-of-sequence signal can for example be coded at a basic frequency of 5 Hz, the information material being carried by an amplitude modulation. A complete end-of-sequence signal interposed at the end of a complete program sequence, and not superimposed on the audio signal can, for example, comprise 13 periods of the signal at 5 Hz. A "1" is represented by a period of the signal at 5 Hz and a "0" by the absence of signal for a period. FIG. 3 gives an example of endof-sequence coded signal SQ which corresponds effectively to the end-of-program signal to which is allocated the code 51.

The fast speed duplication installation illustrated in FIG. 1 comprises, for each master assembly 11 reading out one track of the master tape 1, a recording assembly comprising a recording equalizer circuit 21, a recording amplifier 25 connected to the output of the recording equalizer 21 and at least one slave recording assembly 31 controlling an associated magnetic head 41 for recording on one track of the final tape 2, signals which are identical to those of the sound program and end-of-sequence signals SQ pre-recorded on the master tape 1. Obviously, the speed at which the instant duplication recording is made on the final tape 2 should be compatible with the speed at which the master tape 1 is read out by the master assembly 11 so as not to distort the sound program signals. Thus, the recording speed on the final tape 2 will be much higher than the normal readout speed of the final band 2.

To achieve in a single stage the complete duplication, of a magnetic tape comprising two pairs of tracks permitting the stereophonic recording of a sound program in the two advancing directions of the tape, four master assemblies 11, 12, 13, 14 associated with four readout heads 115, 125, 135, 145 can work simultaneously to read out the four tracks of the master tape 1. Master assemblies 12, 13 and 14 are strictly identical to the aforedescribed master assembly 11. In this case, simultaneous recording on the four tracks of the final tape 2 is achieved with four recording assemblies associated to four magnetic heads 41, 42, 43, 44 and connected respectively to master assemblies 11, 12, 13, 14. The recording sub-assemblies each comprise a recording equalizer 21, 22, 23, 24, a recording amplifier 25, 26, 27, 28 and at least one slave recording assembly 31, 32, 33, 34 which controls the associated magnetic head 41, 42, 43, 44 recording on the final tape 2.

In practice, the looped over master tape 1 performs several successive rotations in front of the readout heads 115, 125, 135, 145 (200 revolutions for example) while the final tape 2 advances in front of the heads 41, 42, 43, 44 so that a succession of recordings of the same program, pre-recorded on the master tape 1, are made one after the other on the final tape 2, the end-of-sequence signal SQ situated at the end of the sound program on the master tape 1 being also reproduced on the final tape 2 after each new recording of the program to be duplicated. Said end-of-sequence signal will thereafter be used for locating the end of each program on the final tape 2 before cutting said tape into sections corresponding to a program and loading said sections into for example a cassette.

The duplication installation can also operate in such a way as to record simultaneously on several final tapes 2, five to ten tapes for example, while reading out from only one master tape 1. In this case several slave recording assemblies such as 31, are mounted in parallel each slave recording assembly being associated to a magnetic head such as 41 serving a specific track of one of the tapes 2. Likewise, for each one of the four tracks of the different final tapes 2, a plurality of slave recording assemblies, each one being associated to its own magnetic head, and mounted in parallel, make simultaneous recordings on several different tapes 2.

Figure 4:
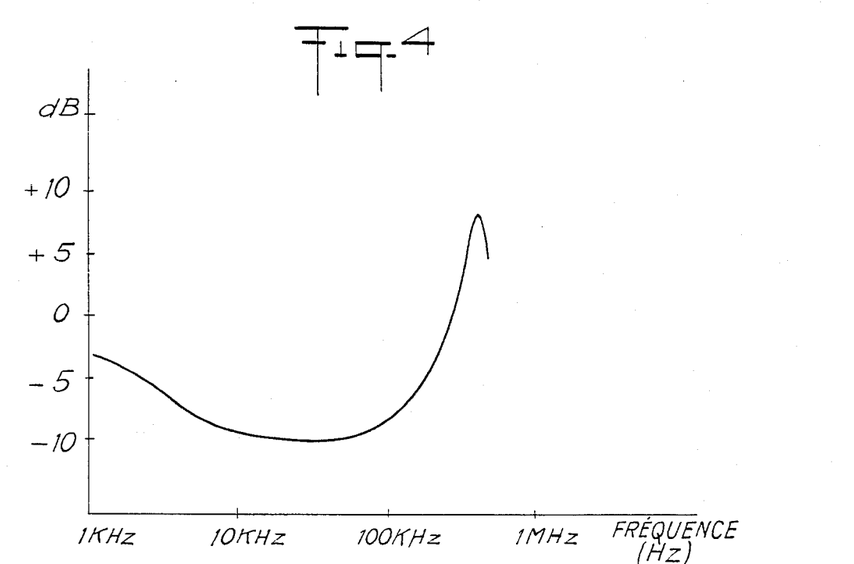
FIG. 4 shows the response curve of a recording equalizer used in the circuits of FIG. 2.

Each slave recording assembly 31, 32, 33, 34 comprises in known manner a sub-assembly 300 comprising a polarizing oscillator 301, a premagnetizing power amplifier 302, and a slave equalizer circuit 303. Said slave equalizer circuit acts as a filter whose response curve is dependent on the frequency which is as illustrated in FIG. 4.

Obviously, a very great number of duplicated recordings can be made on one or more final tapes 2 from the same program recorded on the master tape 1. In the case where a coded signal situated outside audible frequencies is recorded on the master tape 1 in superimposition on the audio signals of the sound program on at least one track for each advancing direction as recommended in U.S. Pat. No. 4,333,113, said coded signal is found as such in the different replicas of the master tape recording made on the final tapes 2.

It is, however, desirable that each individual cassette, even produced by duplication, comprises an identification means which is exclusive thereto in order to avert or to detect unauthorized duplications.

According to the invention, on at least one track for each advancing direction of the magnetic tape, and during an individual operation to record the sound information on the final tape 2 with a slave recording assembly 31, an auxiliary signal is introduced which signal is constituted by a coded digital signal derived from a pilot frequency and incremented everytime an end-of-sequence signal SQ is detected, so that the said auxiliary signal comprises a specific identification code which is changed for each new duplication of the prerecorded basic program. Thereafter, with the method according to the invention, two different recordings of one and the same program must necessarily have different identification codes and the presence of a batch of cassettes showing all the same identification code is a proof of a pirate duplication.

The auxiliary coded identifying signal is mixed with the sound information signal during the recording operation by means of the slave recording assembly 31 so that said auxiliary signal is repeated throughout the recording. The auxiliary coded signal can be such as described in U.S. Pat.No. 4,333,113 which relates to a method for associating an auxiliary information to a principal information. In the case of the present invention however, since an auxiliary identifying signal is introduced during a fast speed duplication operation, the coded digital auxiliary signal being derived from a pilot frequency F which corresponds to a basic frequency f situated in a range outside the spectrum of audible frequencies towards the ultrasounds, for example between about 15 and 18 kHz, multiplied by a multiplying factor equal to the ratio of the advancing speed of the final tape 2 during the individual recording operation to the normal speed at which said tape is read out. Said multiplying factor can be for example 8, 16, 32 or 64 is dependent on the type of fast speed duplication installation used.

The auxiliary signal is preferably recorded at a level of amplitude of several tens of decibels below the maximum level of the sound information signal and, although it may remain perfectly inaudible due especially to its frequency, it can actually be picked up during reproduction by the reading device provided that a suitable decoder be added to the latter.

There are several possibilities for coding the auxiliary information with a view to producing the auxiliary signal, and it is possible to this end to call on the known techniques of digital or analog data transmission using the known processes of coding and modulation.

The auxiliary signal can for example be a "portion" of information of relatively short duration, between 5 and 10 seconds, constituted in a plurality of periods, as follows.

A first period is formed by a signal of fixed frequency Fo situated inside the range of inaudible frequencies, for example between 16 and 18 kHz.

A second period contains a modulation of the frequency Fo to a digital bit synchronization rate (primary synchronization). Modulation is for example of the FSK type (Frequency Shift Keying) the frequency of the modulated signal taking on the value of Fo+$\Delta$F or Fo−$\Delta$F depending on the value of the binary information. $\Delta$F is for example equal to several hundred Hz.

A third period contains a coded word also known as a format synchronization word, which is found in all recordings of one and the same type and which is used to determine the exact moment when the message which constitutes the auxiliary information proper, actually begins (secondary synchronization).

The fourth and last period contains this message which particularizes the recording with which it is associated and which is modified after every detection of an end-of-sequence signal. Said message will for example comprise the elements for identifying the place where the recording was made, the date and time of recording, the recording laboratory, the recording machine and the order number of the individual recording made during a recording session of a series of successive sound programs on the same final tape 2 using the same machine over a predetermined period of time such as for example one hour.

The slave recording assembly 31 which is designed to introduce the auxiliary identification signal on a given track of the final tape 2 comprises circuits 310 for detecting and regenerating end-of-sequence signals. Said circuits 110 are connected to the output of the recording amplifier 25 and are associated to circuits 320 of digital coding by derivation from a pilot frequency to produce the coded auxiliary digital signal which is mixed with the sound information signal in an adder circuit 340 upstream of the slave recording head 41. The adder circuit could be connected before the slave equalizer circuit 303, but it is preferably placed downstream thereof to avoid the filtering effect of the circuit 303 affecting the coded auxiliary signal.

It suffices to introduce the auxiliary identification signal may be introduced in only one of the two tracks of the tape 2 advancing in the same direction. In this case, it is possible to superpose on the audio signals recorded on the other track, at the level of the master tape 1, coded auxiliary signals designed to indicate for example the title of the work or the name of its author, i.e. comprising information material linked to the recorded sound program which will be identically reproduced on all the replicas made on the final tape 2 from the master tape 1. Each one of the two stereophonic recording tracks of a magnetic tape 2 can thus independently receive coded digital auxiliary signals, in addition to the audio signals, the said auxiliary signals all playing specific parts. On one of the tracks, the coded signals carry information material relating to the recorded program and have been mixed with the audio signals recorded from the master tape 1, whereas on the other track, the coded signals carry information material related to the duplication operation in order to give an identification to each cassette produced, and they are mixed to the audio signals during the recording by the slave recording assemblies of the duplication installation.

It should be noted that the registration of the coded auxiliary signal identifying a production can be recorded simultaneously in one operation, on the one hand, on one of the tracks of the pair of tracks associated to one advancing direction of the final tape 2 and on the other hand, on one of the tracks of the pair of tracks associated to the other advancing direction of said final tape 2. In this case, one circuit 310 for detecting and regenerating end-of-sequence signals and one digital coding circuit 320 suffice to produce a coded auxiliary digital identifying signal which can be recorded on two of the four tracks of the final tape 2. Indeed, the coded identification signal remains the same for one cassette whatever the advancing direction. Also, it is possible for the auxiliary digital signal produced by the digital coding circuit 320 incorporated to the slave recording assembly 31, not only to be mixed with the sound information signal to be recorded by the head 41 on the first track of a pair of tracks of the final tape 2 corresponding to one advancing direction, but also to be mixed with the sound information signal to be recorded by the head 44 on one of the tracks of the pair of tracks of the tape 2 corresponding to the other advancing direction, provided however that for this last operation, the direction of the code of the auxiliary digital identification signal be reversed, by way of a converter circuit 341 for example.

A special embodiment of the circuits permitting to produce and to increment the auxiliary digital identifying signal will now be described with reference to FIG. 2.

The circuits producing the auxiliary identification signal are controlled by a microprocessor 335 which cooperates, on the one hand, with a phase loop associated to a stabilized clock 321 supplying a reference signal at a frequency Fo, and on the other hand, with incremental circuits using the detection of the end-ofsequence signal SQ which is found at the end of each sequence of the sound programme read from the master tape 1.

The information material for producing the coded auxiliary digital signal is preferably recorded in memories 336, such as programmable memories of the EPROM type associated with the microprocessor 335.

Advantageously, the delivery by the microprocessor 335 and by the associated memories 336 of the information material for producing the coded auxiliary digital signal is only authorized by authorization circuit 330 in response to the application to these authorization circuits 330 of a safety code which may be applied by means of a medium 350 such as a magnetic card, a static cassette or any other equivalent information medium. It is possible to arrange for the application of the safety code to the authorization circuits 330 to initiate the delivery of a predetermined and limited number of items of information for producing the coded auxiliary digital signal. It is equally possible to record discharge information, with the authorization circuits 330, on the medium 350 applying the safety code, when said authorization means 330 have given an authorization to produce an auxiliary safety signal in response to the application of the safety code. Conventionally, a keyboard 334 and a display device 332 with their corresponding interface circuits 333 and 331 can be associated to the microprocessor 335.

The coded digital auxiliary identifying signals are produced from information material contained in the memories 336 and from end-of-sequence signals SQ detected and processed in the circuits 310 situated at the output of a recording amplifier such as 25. A phase loop comprising a voltage controlled oscillator 326, enables the application to the adder circuit 340 of coded digital signals by derivation from a pilot frequency modulated according to the FSK modulation principle.

Figure 2:
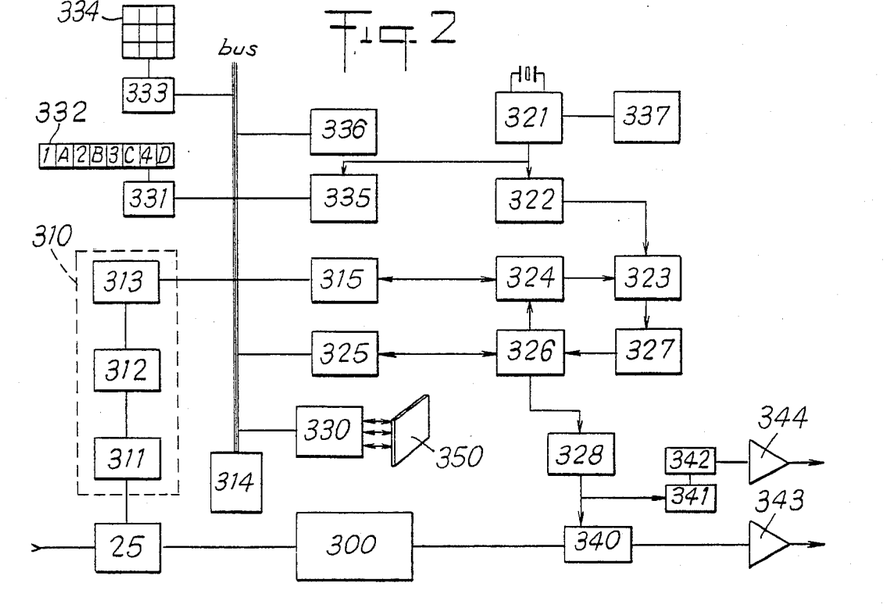
FIG. 2 is a view of the special coding circuits used with the installation according to FIG. 1.

As can be seen from the diagram shown in FIG. 2, the frequency signals Fo issued from the stabilized clock 321 which is itself preferably fed from a separate supply battery 337, are applied, on the one hand, to the microprocessor 335 and on the other hand to a fixed divider circuit 322 dividing by a predetermined number N. The reference signal of fixed frequency Fo/N is applied to a first input of a phase comparator 323, whose output is connected, via an integrator circuit 327, to the voltage-controlled oscillator 326. A programmed divider circuit 324 receiving from the bus of the microprocessor 335 the information material for producing the coded auxiliary digital signal via a divider interface circuit 315 has an output connected to the second input of the phase comparator circuit 323. The voltage controlled oscillator 326 is also connected to the programmed divider circuit 324 to constitute a phase loop. The coded auxiliary digital signals issued from the voltage controlled oscillator 326 are applied to the adder circuit 340 via a shaping circuit 328, for example, a sinusoidal shaping circuit.

The circuits shown in FIG. 2 can be adapted to the production of digital auxiliary signals coded by derivation from a specific frequency selected from a plurality of fixed frequencies corresponding to a basic frequency f situated in a range outside the audible frequencies, multiplied by multiplying factors which are equal to the ratio of the various possible advancing speeds of the final recording medium 2 during the recording by the head 41, to the advancing speed of said final medium 2 during normal readout. The choice of the said speed ratio and therefore the value of the multiplying factor is displayed at the start and the range switching circuit 325 connected to the bus of the microprocessor 335 and to the voltage controlled oscillator 326 enables to switch the frequency of said oscillator 326 over to the suitable value. In practice, the said multiplying factor is often equal to 8, 16, 32 or 64.

The circuits 310 for detecting and processing the end-of-sequence signal SQ comprise: a passband filter 311 designed to extract the signals situated in the frequency band of the signal SQ (between for example 5 and 10 Hz), a detection circuit 312 and an interface circuit 313 connected to the bus of the microprocessor processor to apply to the latter coded digital signals adapted so as to allow, at each detection of a signal SQ, the incrementing of the signals supplied in the divider interface circuit 315. A circuit 314 for counting and displaying the number of detections of an end-of-sequence signal SQ can advantageously be associated to this system, although this is not absolutely necessary for generating coded digital auxiliary signals.

Amplifiers 343, 344 may if necessary be inserted between the circuits 340, 342 and the corresponding heads 41, 44 on every track which is intended to receive auxiliary signals.

The identifying control of finished productions such as cassettes, equipped with auxiliary signals of identification superposed on the sound program signals over at least one recording track, according to the method described hereinabove, can easily be performed using a decoder such as that described in U.S. Pat. No. 4,333,113 and illustrated in FIG. 5. It will however be noted that to detect unauthorized productions, there is no need to make a complete decoding of the identification signals. Indeed, by simple comparison in a comparator circuit of the signals recorded in the two productions, such as, for example, in two cassettes of the same batch, it is possible to determine whether or not said cassettes are the result of an authorized duplication. Indeed, if they are not, the identification signals are strictly identical whereas the authorized productions according to the invention all have identification signals with different codes. And obviously, no identification signals at all is also a proof of piracy.

Figure 5:
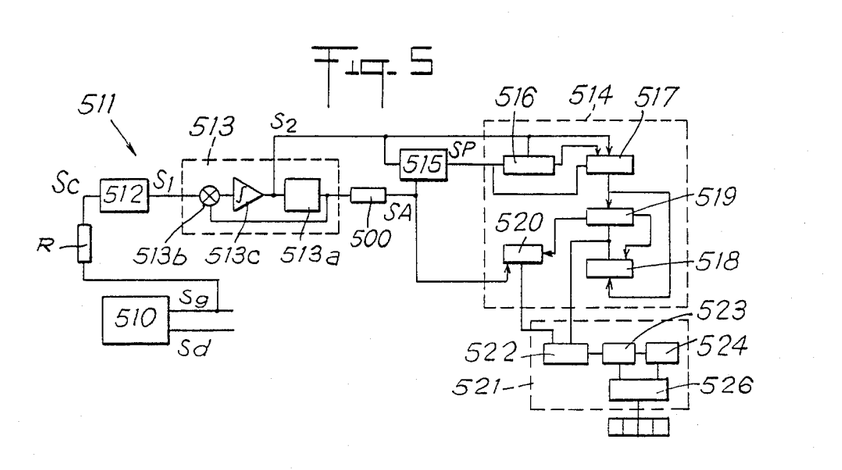
FIG. 5 shows an example of a decoding circuit designed to cooperate with means for reading out the coded final recording media according to the present invention.

FIG. 5 diagrammatically illustrates a device permitting the detecting of the presence of an auxiliary signal such as that defined hereinabove, superimposed on a principal signal in the readout signals furnished by a reading head 510, (a stereophonic reading head for example), passing over two tracks of a recording medium (not shown).

The readout signals of one of the tracks being required to contain auxiliary signals, the lefthand track sg for example, are applied to the input of a detection circuit 511 connected in shunt to the output of the reading head.

The detection circuit comprises a filtering and reshaping circuit 512 receiving the signals sg of the selected track, via a high value resistor R. The circuit 512 may be constituted by a phase loop whose voltage controlled oscillator furnishes at the output a signal at a frequency which may vary on either side of the frequency f with a limited excursion. The detected auxiliary signal is amplified and re-shaped (signal S1).

The width of the passband of the circuit 512 is selected in relation to the width of the band occupied by the modulation and to the possible variations of the readout speed (at maximum about 5% on either side of the nominal speed).

A demodulator circuit 513 is connected to the output of the circuit 512 in order, on the one hand, to furnish the logic decoding circuit 514 with a demodulated digital signal and, on the other hand, to control a bit synchronization signal generator 515 or primary synchronization signal.

To form the demodulator 513, a phase loop centered on the frequency f may be used, comprising a voltage controlled oscillator 513a, a phase comparator 513b receiving the signal S1 and the output signal of the oscillator 513a, and an integrator amplifier 513c receiving the error signal furnished by the comparator 513b and controlling the oscillator 513a. The signal S2 is taken at the output of the amplifier 513c, each sign change of this output corresponding to a passage of the frequency $f+\Delta f$ to $F-\Delta f$ or vice versa.

The output signal of the oscillator 513a indicates the synchronization of the demodulators 513. Said synchronization signal initiates the functioning of the generator 515; then the signal S2 is preponderant for the synchronization of bits. The synchronization signal is converted into a D.C. or authorization signal SA which returns to zero a predetermined period of time after the last pulse emitted by the oscillator 513a, via a retrigger monostable circuit 500.

This logic circuit 514 comprises a format recognition circuit 516 loaded by the decoded bits of the signal S2 at the rate of signal SP. When the configuration corresponding to the coded format synchronization word is recognized in the circuit 516 (secondary synchronization), the latter authorizes the load of the next bits in a register 517.

The contents of register 517 are compared with the contents of a register 518 by means of a comparator 519 which, in the case of equality, increments a counter 520 by one unit and, in the case of inequality, controls the transfer in the register 518 of the contents of register 517.

When, as a safety precaution, the counter 520 has counted a predetermined number of equalities, the contents of register 518, i.e. the auxiliary information associated to the readout recording, are transferred in a register 522 of an interface circuit 521. The interface circuit 521 can also contain other registers 523, 524 for storing different auxiliary items of information detected successively on different recordings and comparing them in a comparator circuit 526.

The invention is in no way limited to the description given hereinabove and various modifications can, on the contrary, be brought to the method and installation according to the invention without departing from the scope and the spirit thereof.

In particular, other known techniques can be used for coding the auxiliary information and for detecting, decoding and transferring said information.

What is claimed is:

1. Method for identifying a sound recording, recorded on at least one track of a recording medium such as a magnetic tape and consisting in associating a coded auxiliary signal with the sound information signal, wherein the auxiliary signal is introduced during an individual recording operation of the sound information signal on the final recording medium, from the readout of a master tape on which, both the sound information signal and an end-of-sequence signal inserted between two sequences of program of the sound information signal have been recorded beforehand, the auxiliary signal being constituted by a coded digital signal derived from a pilot frequency and incremented at each detection of an end-of-sequence signal when the master tape is read out, and in mixing the auxiliary signal with the sound information signal while recording the sound information signal on the final recording medium in such a way as to inscribe the auxiliary signal repeatedly throughout the whole recording, the coded digital auxiliary signal being derived from a pilot frequency F which corresponds to a basic frequency f situated in a range outside the spectrum of audible frequencies towards the ultrasounds multiplied by a factor equal to the ratio of the advancing speed of the individual medium of final recording during the individual recording operation, to the advance speed of the individual medium of final recording during normal readout thereof.

2. Method as claimed in claim 1, wherein the auxiliary signal is mixed with the sound information signal once the latter has gone through the equalizer circuits provided in the individual device used for recording on the final recording medium.

3. Method as claimed in claim 1, wherein several individual operations of simultaneous recording of the same sound information signal are associated with coded auxiliary signals specific to every final recording medium, and said individual recording operations are conducted in cooperation with only one readout of a common master tape.

4. Method as claimed in claim 1, wherein in the course of two simultaneous individual operations to record on two different tracks of the same final recording medium from the readout of the two corresponding tracks of a master tape, a first coded auxiliary signal is introduced on one track of the final recording medium, while a second coded auxiliary signal corresponding to a signal coded sequentially in reverse to the first signal, is introduced on the other track of the final recording medium.

5. Method as claimed in claim 1, wherein the said multiplying factor is equal to 8, 16, 32 or 64.

6. Method as claimed in claim 1, wherein the basic frequency f is between about 15 and 18 kHz.

7. Method as claimed in claim 1, wherein the end-of-program sequence signal has a basic frequency which can vary between about 5 Hz and 10 Hz, said signal is carried by an amplitude modulation and is recorded on the master tape in the free gaps situated between two different consecutive program sequences of the sound information signal.

8. Method as claimed in claim 1, wherein the said auxiliary signal is recorded at a level of amplitude lower by several tens decibels than the maximum level of the sound information signal.

9. Method as claimed in claim 1, wherein the auxiliary signal comprises, after a fixed frequency period, a primary synchronization period defining a digital signal rate, a secondary synchronization period comprising a coded group known as format group, then a specific coded group of which at least one part is modified after every detection of and end-of-sequence signal.

10. Method as claimed in claim 9, wherein the specific coded group can itself contain information relative to the place, date and time of recording, to the number of the recording machine and to the order number of the individual recording made during a recording of a series of individual media of final recordings, on the same machine and over a predetermined time period.

11. Installation for duplicating sound recordings made on at least one track of a recording medium such as a magnetic tape, of the type comprising a master assembly for reading the sound information signals and the end-of-program sequence signal recorded of a master tape, and at least one slave assembly to record on an individual medium of final recording the said sound information signals and end-of-sequence signals read out from the master tape; the said slave recording assembly comprising, associated to a recording equalizer circuit and to a recording amplifier circuit, at least one slave equalizer circuit, one polarizing oscillator and one premagnetizing power amplifier, installation wherein the said slave assembly comprises circuits for detecting a regenerating end-of-sequence signals, which circuits are connected to the output of the said recording amplifier, digital coding circuits by derivation from a pilot frequency for producing a coded auxiliary digital signal, means associated to the end-of-sequence signal regenerating circuit and connected to the digital coding circuits to modify the digital coding at each new detection of end-of-sequence signals and an adder circuit to add the coded auxiliary digital signal with the sound information signal and upstream of the slave recording head on the final recording individual medium.

12. Installation as claimed in claim 11, wherein the adder circuit is connected to the output of the slave equalizer circuit.

13. Installation as claimed in claim 11, wherein the end-of-sequence signal regeneration and detection circuits comprise a passband filter and a detection circuit for regenerating a demodulated binary coded end-of-sequence signal.

14. Installation as claimed in claim 11, wherein the circuits of frequency derived digital coding comprise a stabilized reference clock, a phase comparator with a first input connected to the output of a fixed divider circuit, a voltage controlled oscillator, connected, on the one hand, to a programmed divider circuit and, on the other hand, to a shaping circuit giving a pure sinusoidal shape, whose output is connected to the adder circuit, an integrating circuit being also inserted between the output of the said phase comparator and the voltage-controlled oscillator and the programmed divider being connected on the one hand to a microprocessor to which are applied the clock signals of the information material producing the coded auxiliary digital signal, and the end-of-programme demodulated binary signal, and on the other hand, to a second input of the said phase comparator.

15. Installation as claimed in claim 14, wherein the information material producing the coded auxiliary digital signal is recorded in memories associated to the microprocessor.

16. Installation as claimed in claim 15, wherein authorization means are provided to deliver the information producing the coded auxiliary digital signal only in response to the application of a safety code to the microprocessor.

17. Installation as claimed in claim 16, wherein said authorization means can authorize the delivery of only a predetermined number of items of information producing the coded auxiliary digital signal when a safety code is applied.

18. Installation as claimed in claim 16, wherein the safety code is applied by way of a medium such as a magnetic card or static cassette and information is recorded on the said medium when the authorization means have given an authorization in response to the application of the safety code.

* * * * *